Figure 11:
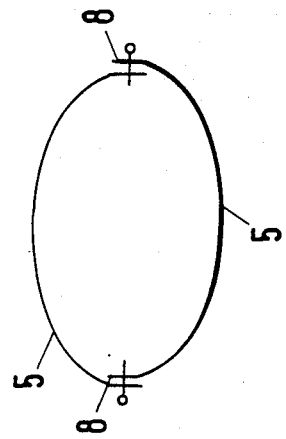

United States Patent [19]
Bores

[11] Patent Number: 4,902,166
[45] Date of Patent: Feb. 20, 1990

[54] SYSTEM FOR CONSTITUTING BREAKWATERS, JETTIES, WITH JUXTAPOSED ELEMENTS

[76] Inventor: Pedro S. Bores, Vegafria 1, T.1., 28035 Madrid, Spain

[21] Appl. No.: 135,136

[22] Filed: Dec. 18, 1987

[51] Int. Cl.⁴ .............................................. E02B 3/06
[52] U.S. Cl. ........................................ 405/30; 405/34
[58] Field of Search .................. 405/15, 21, 30, 31, 405/33, 34, 35

[56] References Cited

U.S. PATENT DOCUMENTS

| | | | |
|---|---|---|---|
| 2,474,786 | 6/1949 | Humphrey | 405/30 |
| 4,083,190 | 4/1978 | Pey | 405/33 |
| 4,188,153 | 2/1980 | Taylor | 405/34 |
| 4,225,269 | 9/1980 | Matsui | 405/33 |

Primary Examiner—David H. Corbin
Attorney, Agent, or Firm—Amster, Rothstein & Ebenstein

[57] ABSTRACT

A jetty comprises a plurality of vertically-extending shallow modular structural elements having parallel upper and lower planar faces, the elements being in a vertically layered, horizontally offset and cantilevered juxtaposition to define a three-dimensional network characterized by vertical gaps between portions of some of the elements. At least some of the elements define at least one aperture extending vertically through the thickness thereof, the system further comprising union members extending through a series of vertically aligned apertures for joining the elements together.

10 Claims, 9 Drawing Sheets

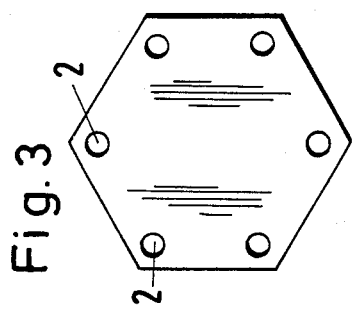
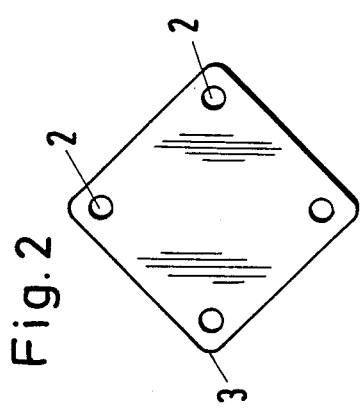
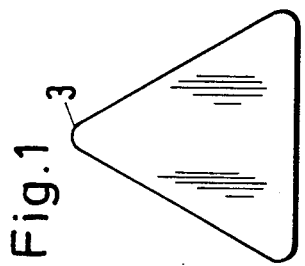
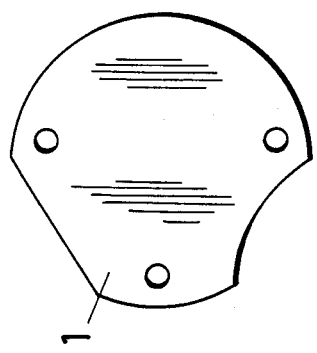
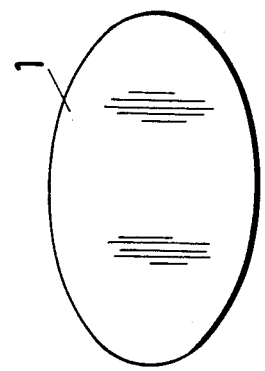
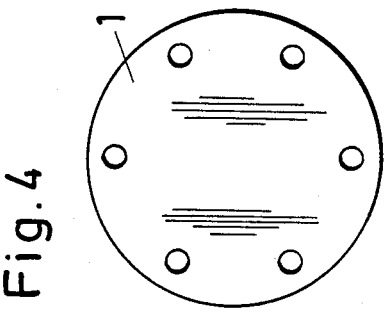

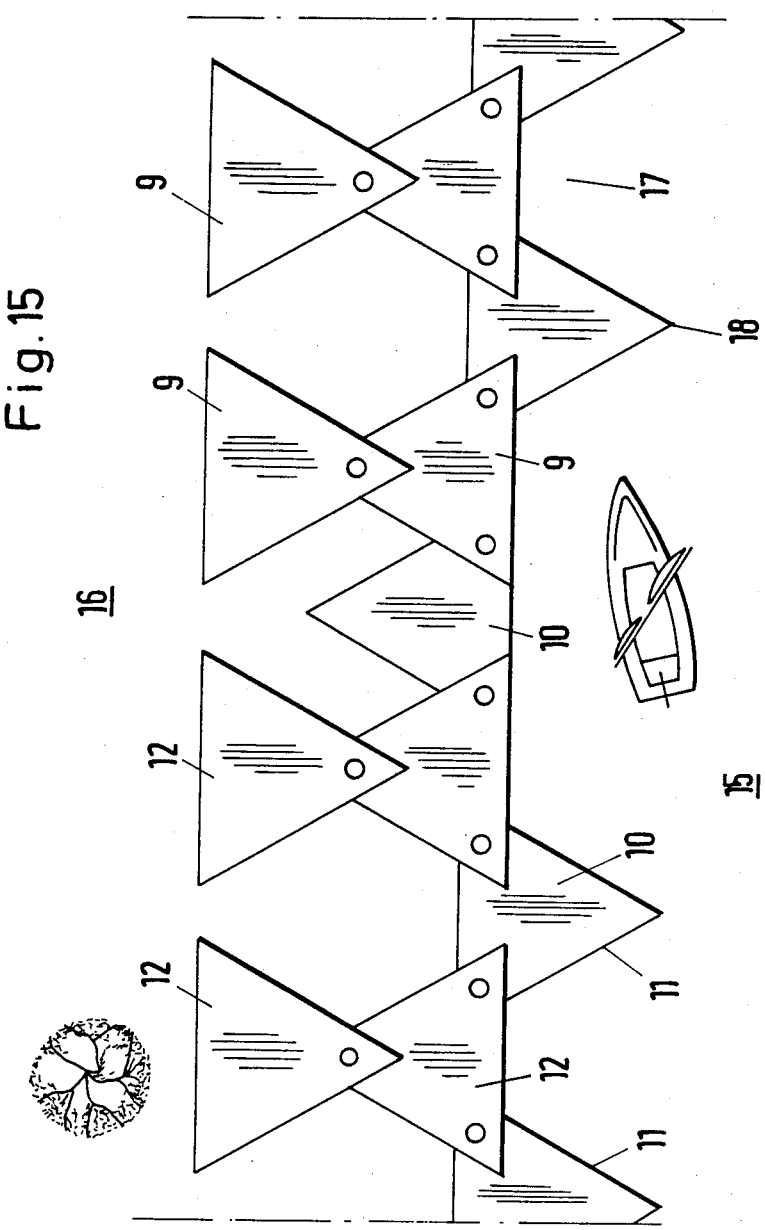

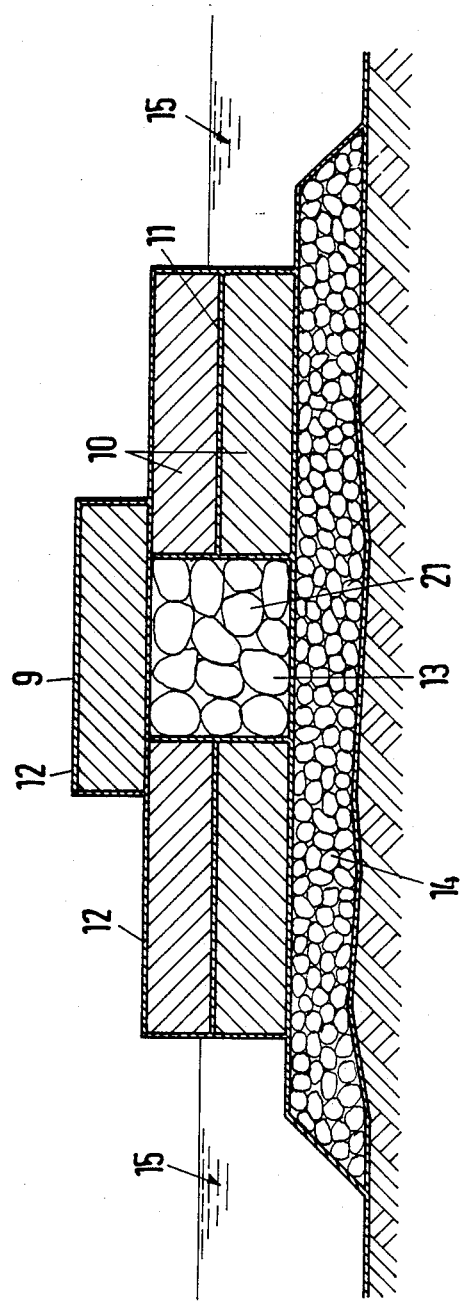

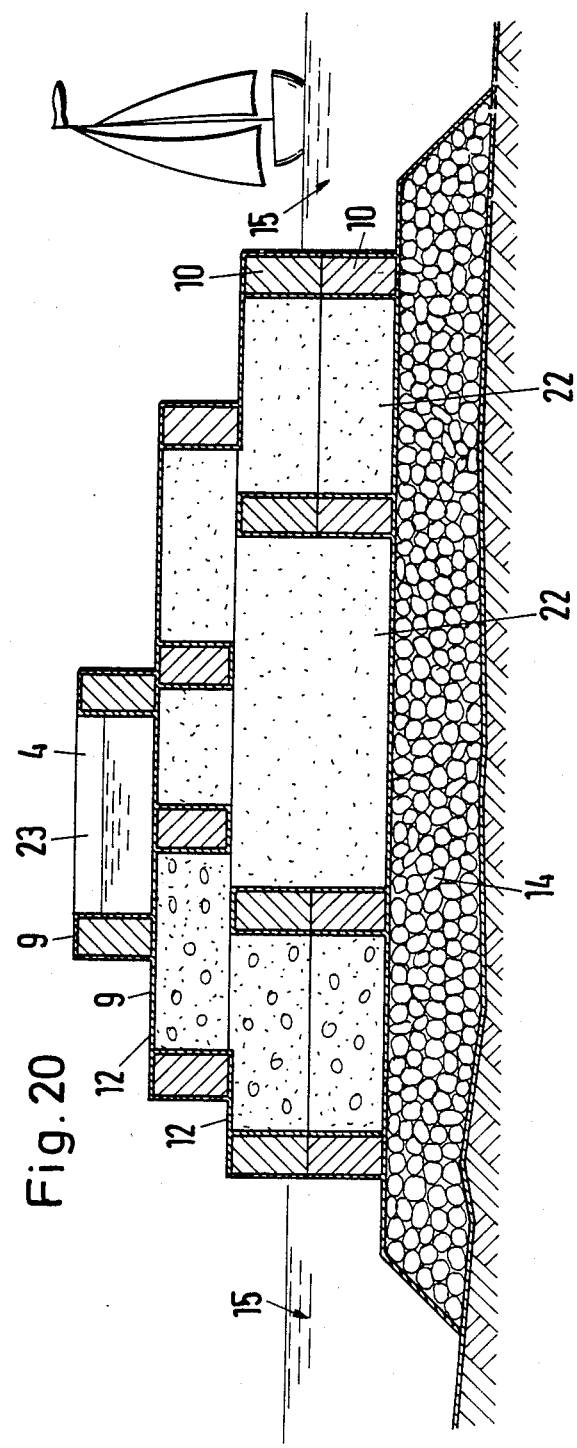

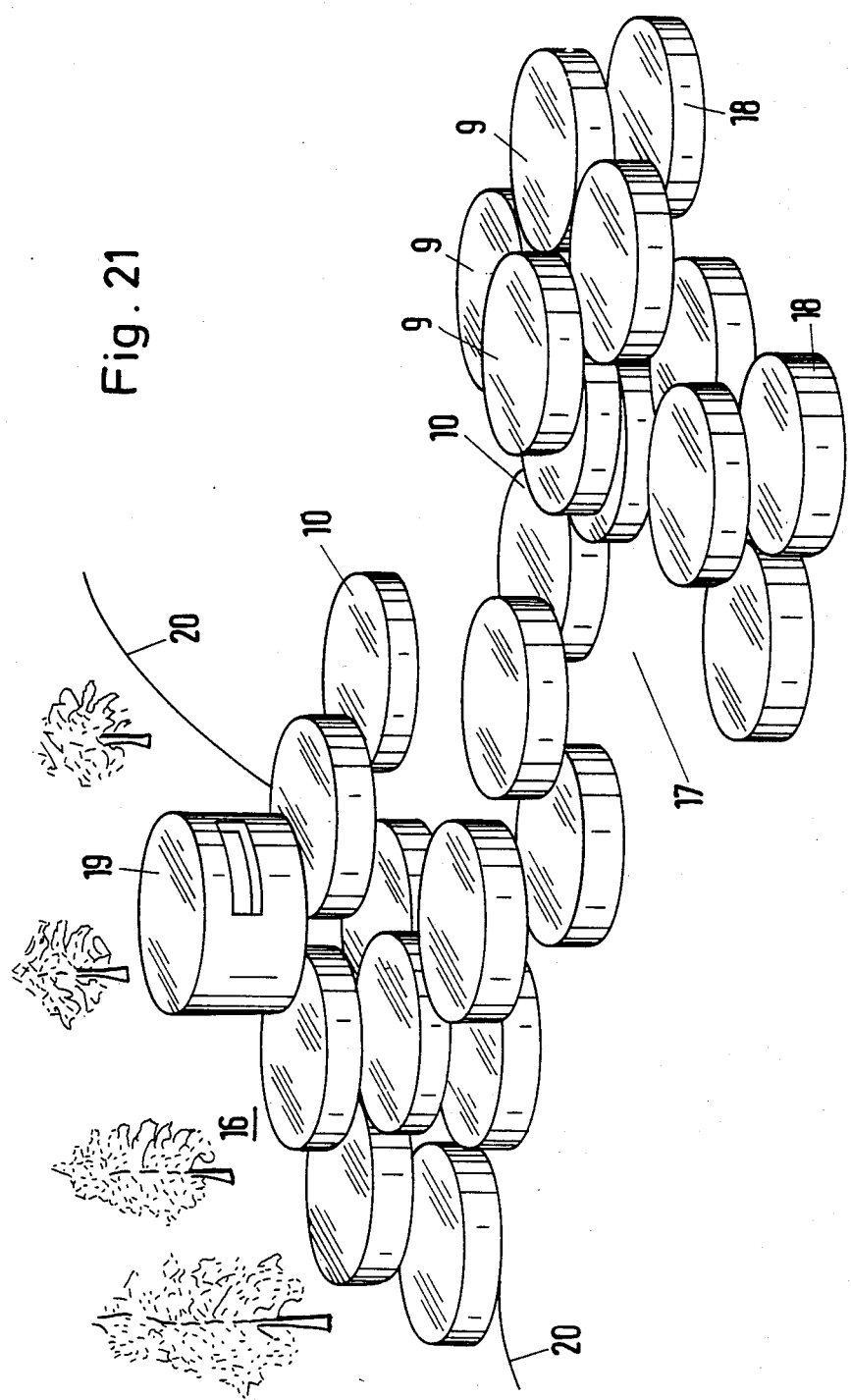

SYSTEM FOR CONSTITUTING BREAKWATERS, JETTIES, WITH JUXTAPOSED ELEMENTS

This invention relates to a system for CONSTITUTING BREAKWATERS, OR JETTIES, WITH JUXTAPOSED ELEMENTS, whose object is to create sheltered areas, spaces for nautical uses (harbours, jetties, etc.) residential uses (lacustrine villages, artificial islands, etc.), recreational uses (swimming pools, marine parks, aquaparks,) etc., as well as to protect, improve the shores of natural (seas, lakes, lagoons, estuaries, rivers, etc.), artificial (reservoirs, pools, canals, etc.) bodies of water, acting as a separate shore, training, support, shelter or boarig structure, achieving an effect on the hydraulics of the shore (currents, wind waves, wake waves, etc.), as well as on the geomorphological processes: erosion, solids transportation, deposition of fine materials.

At the present time, these structures are performed with breakwaters, or jetties, which may be rubble mound, natural or artificial, or monolithic, and the latter may be vertical or mixed. All these kinds of conventional breakwaters, or jetties, are designed to specifically fulfill the function for which they are intended: signpost and recreational facility support, etc., shore protection, training, support, shelter and/or bearing and, in certain cases, vessel berthing. They are dimensioned to mainly withstand the action of wind waves, waves, currents, etc. Their morphology has been oriented towards specifically fulfilling these functions, forgetting other possible uses and/or requirements such as their being occupied for recreational purposes, their aesthetic quality, their blending in with the environment, etc., which are all such highly valued qualities nowadays.

Apart from various particular disadvantages, all these conventional breakwaters, or jetties, have the common disadvantages of their large cross dimensions in functions as a shelter and even in those for training and/or support, which create real "visual barriers" for the shore's users and even frequently for occupants of low buildings. air circulation is likewise altered immediately above the surface by these barriers, causing the "pot effect", with an increase in temperatures in the areas affected by the breakwaters, particularly when the sheltered areas are small in dimension and air circulation in the lowest layers immediately above the surface is interrupted.

Conventional, vertical and mixed monolithic breakwaters are, in addition, highly reflective to gravity waves (wind waves, wake waves, etc.) which greatly increases choppiness in front of them, generates cross wave action, possile resonances, etc. causing problems in using the water surface and for suitable beach stability.

A very important, particular disadvantage of rubble mound breakwater, which are those most used, especially in sea shore coastal structures, is their hazardness when applied to recreational facilities. The most frequent accidents to those daring users who risk clambering over them (mainly anglers and bathers) are usually simple scratches but broken legs and/or arms and even fatal accidents are not infrequent.

In general, conventional breakwaters, or jetties, whether vertical, mixed or rubble mound, but particularly the latter, have a very low aesthetic quality.

This invention relates to a SYSTEM FOR CONSTITUTING BREAKWATERS, OR JETTIES, WITH JUXTAPOSED ELEMENTS, applicable in support, shelter, training and shore structures in natural and artificial bodies of water. These breakwaters, or jetties, are made up of thin tubular or columnar ELEMENTS with polygonal, curvilinear or mixed bases, preferably flat parallel, with flat, warped and mixed side faces, with these elements adjacent, supported, linked statically or hyperstatically, forming SPATIAL NETWORKS of juxtaposed and superimposed elements in arrangements with a stepped crown top and a surrounding with inlets and promontories, preferably irregular, random, partially reflecting. The overall unit thus constituted is planned to be partially permeable.

The ELEMENTS can be CONSTRUCTED with conventional methods, preferably with prefabricated, anticorrosive, metal, plastic, portrean and mixed materials, preferably with concrete and asbestos cements which make up:

The WHOLE of the elements themselves

Part or the whole of the lateral outline of these elements: PERIMETER ELEMENTS,

Part or the whole of the top and bottom based thereof: BASE PARTS.

Both the ELEMENTS and the PARTS making them up may have low reliefs (with striations, crevices, etc.) and/or high reliefs (with protuberances, peaks, etc.) which will improve the construction, functional and/or aesthetic qualities of the whole, as well as devices (pins, screws, etc.) and arrangements (protuberances, holes, grooves, etc.) facilitating the isostatic or hyperstatic union between elements and their component parts.

The BREAKWATER, OR JETTY, may be built as per this system

With PERIMETER PARTS, forming hollowed out elements or simple surroundings of the elements, acting as containment walls for fill materials (sand, gravel, rock fill) or mass or injected concrete.

With PERIMETER PARTS and BOTTOM BASES, forming open enclosure, or "troughs", leak-tight if necessary, which may be occupied by sand, vegetation and water, functioning as areas of repose, swimming pools, fountains, etc.

With PERIMETER PARTS and both BOTTOM and TOP bases forming enclosed leask-tight enclosures, or "chambers", totally or partially built with transparent and translucent materials facilitating undersea observation, etc. and acting, should such be the case, for the signposting itself of the structure.

In general, provided the structural and functional conditions require, the interior spaces of the elements themselves as well as those between these elements must:

Be at least partially filled with rockfill and other materials which reduces permeability (both hydraulic and to possible solid littoral drift) and increases the stability and strength of the structure.

Be filled with concrete, with suitable metal, plastic, etc. union and anchor pieces which will enable a monolithic unit or units to be formed (separated by the due expansion joints) able to mechanically and statically withstand the action of littoral dynamics, overturning and sliding.

Obviously, only when the acting littoral dynamics (wind waves, wake waves, currents, etc.) are low in intensity and other conditioning factors, whether geotechnical or constructional etc. so justify, the parts and elements of this invention may be separate and simply supported with no type of resistant union.

Highly characteristic particular advantages of this SYSTEM, when the union between elements is not permanently fixed are:

The POSSIBILITY OR REMOVAL enabling the BREAKWATER, OR JETTY, to be moved in accordance with beach growth, the BREAKWATER, OR JETTY, to be remodelled, according to future functional, aesthetic or environmental requirements etc. and even THE STRUCTURE to be eliminated whenever convenient.

FLEXIBILITY enabling it to be used in areas where it is difficult to make foundations, or even where there is differential settlement. Unions unconfined in a vertical direction and resistant in the horizontal facilitate both the possibility of removal and the flexibility of the BREAKWATER, OR JETTY.

PERMEABILITY which, when the crown elevation of the BREAKWATER, OR JETTY, is low, converts it into an "integrated energy dissipator" (by overtopping, with a suitable crown arrangement, and by percolation through the structure) which turns this BREAKWATER, OR JETTY, into an authentic BREAKWATER, OR JETTY OR REEF.

Contrary to conventional, vertical and mixed rubble mound breakwaters, or jetties, the BREAKWATER, OR JETTIES, built with the SYSTEM which is the subject of this invention patent offer, both in elevation and in plan, a maximum shape and structural variety, with ordered and random arrangements, forming capes, coves, cavities, etc. with dimensions and morphology as varied as required in each particular case with practically no limitation. This occurs not only on the sea side but also in the interior areas (dock basins, inlets, etc.) which prevents possible multiple reflections and resonances within the latter. All this gives the following additional advantages:

If such be the case, it facilitates support of possible beaches, which is problematical in the case of conventional breakwaters or jetties.

It facilitates vessel berthing, although it may be recommendable on occasions only in the season.

It allows better recreational use (fishing, bathing, nautical sports, etc.) in the aquatic environment both inside and outside the BREAKWATER OR JETTY.

It facilitates occupation of the structure itself by medium sized groups of people (families, groups of friends, etc.) with recreational and sports purposes, etc. The recreational use of the structure itself increases not only the capacity but also the quality of the offer, of the shore itself, with a consequent improvement in profitability (social, economic, etc.)

It allows aesthetic and scenic optimization of the shore and its surroundings, offering structural, functional and environmental aspects all together, and enabling the structure itself to blend in as a panoramic element, from the shore as a view and from the structure itself as a "panoramic point" with the systems thus acting as a BREAKWATER OR JETTY PANORAMA.

This SYSTEM may be used, preferably, on foundation platforms and on conventional rubble mound or vertical breakwaters, on jetties, preferably submerged, with a crown suitably arranged for placing the elements (when totally or partially prefabricated) and for building the structure (when the elements are in situ made) in accordance with this SYSTEM, thus constituting the structure's superstructure. These platforms and conventional breakwaters, or jetties, plus those units and, should such be the case, the fill of the former form collaborating units, especially resistant when the fill is mass and/or injected concrete, and the duc metal and plastic union and anchor pieces are fitted, if such be the case. Economic and construction reasons, together with sea bottom characteristics, will decide on the solution to be adopted for the infrastructure.

These and other advantages can be deducd from an analysis of the figures attached as clarification, with a non limiting definition, of the subject of this invention.

FIGS. 1 to 6 show in ground plan some of the preferred shapes of the elements, called 1 which, according to the system which is the subject of this invention patent, constitute the BREAKWATER, OR JETTY, with juxtaposed elements. In order to demonstrate its possible variety, FIGS. 1, 2 and 3 are polygonal, FIGS. 4 and 5 are curvilinear and FIG. 6 is mixed.

The polygonal shapes may have their vertices rounded, as indicated in FIGS. 1 and 2 under the denomination 3. Arrangements are shown under the denomination 2 which facilitate the union between juxtaposed elements.

Figure 7:
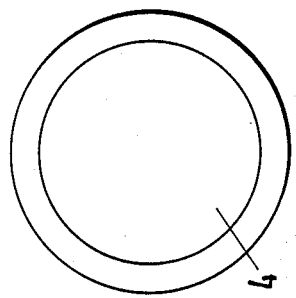
Figure 8:
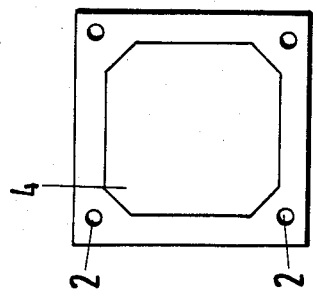

Under the denomination 4 in FIGS. 7 and 8, the hollowing out, or lightening holes, are shown in plan in two concrete elements that may be used as containers for earth, sand, water etc., and usable as swimming pools, fountains, etc.

Figure 9:
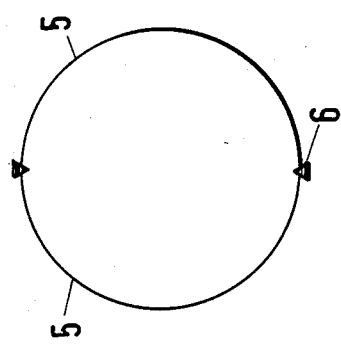
Figure 10:
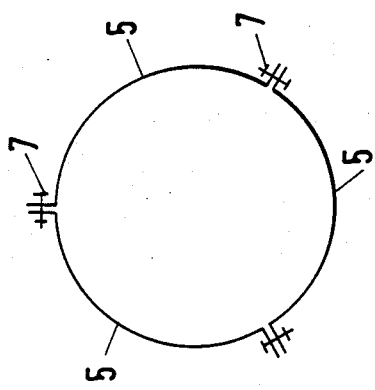

When this hollowing out penetrates right through, elements 1 are reduced to simple PERIMETER PARTS. FIGS. 9, 10 and 11 show three plan views of PERIMETER PARTS 5, prefabricated with high tensile strength materials (metalic, plastics, asbestos cement, etc.) and with various alternatives for union between the two, three or more parts making up these perimeter pieces. Denomination 6 shows welded unions, or links; 7 bolted unions and 8, pinned unions. These PERIMETER PARTS, 5, may act either as permanent shuttering (in which case it is advisable to place the union itself on the inside), or as strikeable shuttering. In the latter case, the use of external bolted, 7, or pinned, 8, unions is advisable for facilitating easy striking.

Figure 12:
Figure 13:
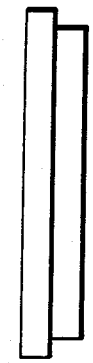
Figure 14:

FIGS. 12, 13 and 14 show side views of some of the shapes possible for lateral surfaces of the elements: Smooth, FIG. 12, stepped, FIG. 13 and ondulated, FIG. 14.

Figure 16:
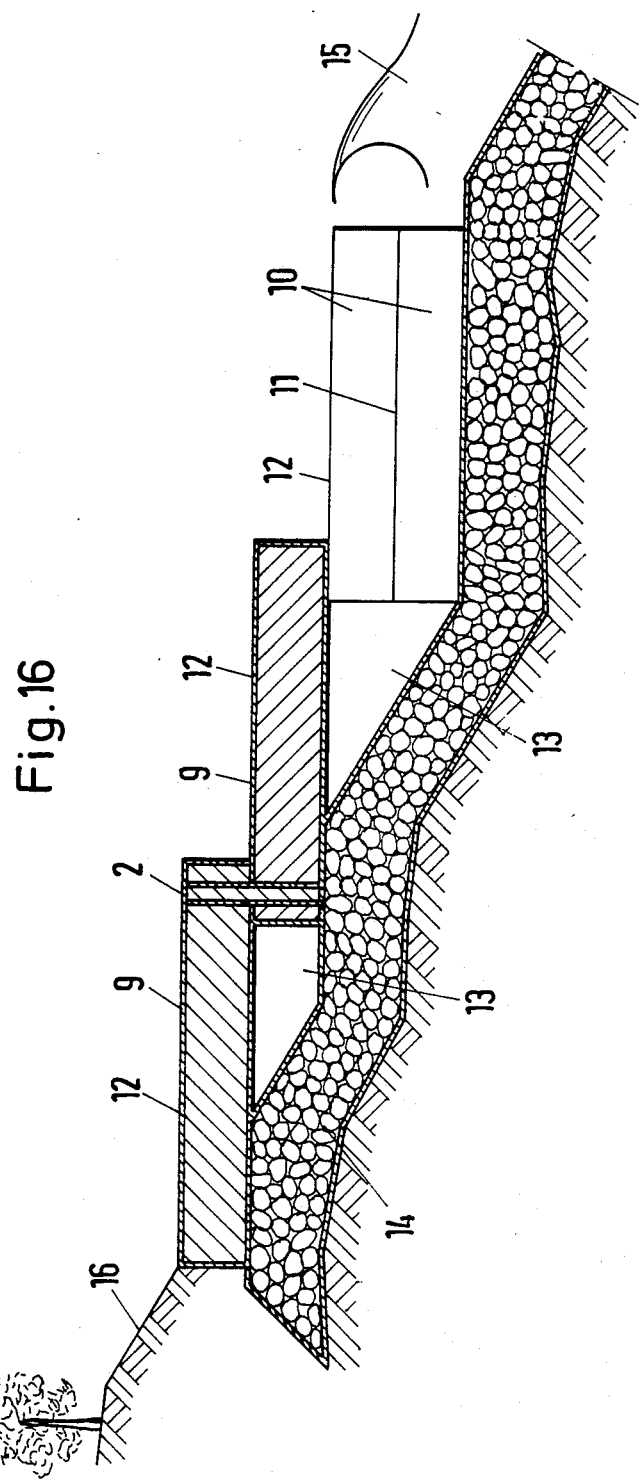

FIGS. 15 and 16 show an application of this invention, in plan and in cross section respectively, with identical equilateral triangular prismatic elemnents 1, acting as a shore breakwater, built on a stepped foundation platform, 14. Even in such an extreme case, an irregular outline is achieved on the side of the body of water offering inlet, 17 and protuberances, 18, in a sawtooth arrangement. Although, in general, elements, 1, are juxtaposed, 9, superimposed on two or more underadjacent elements, forming reticular spatial structures, some of them may be superimposed on a single underadjacent element, 10, forming columnar structures, 11. The component elements, 1, in this application are simply supported, with no resistant union, forming a stepped crown, 12. The spaces, 13, between the elements, 1, may be filled with loose materials, with concrete, etc. The body of water is shown with 15 (sea, lake, etc.) and the earth, shore, with 16.

Figure 17:
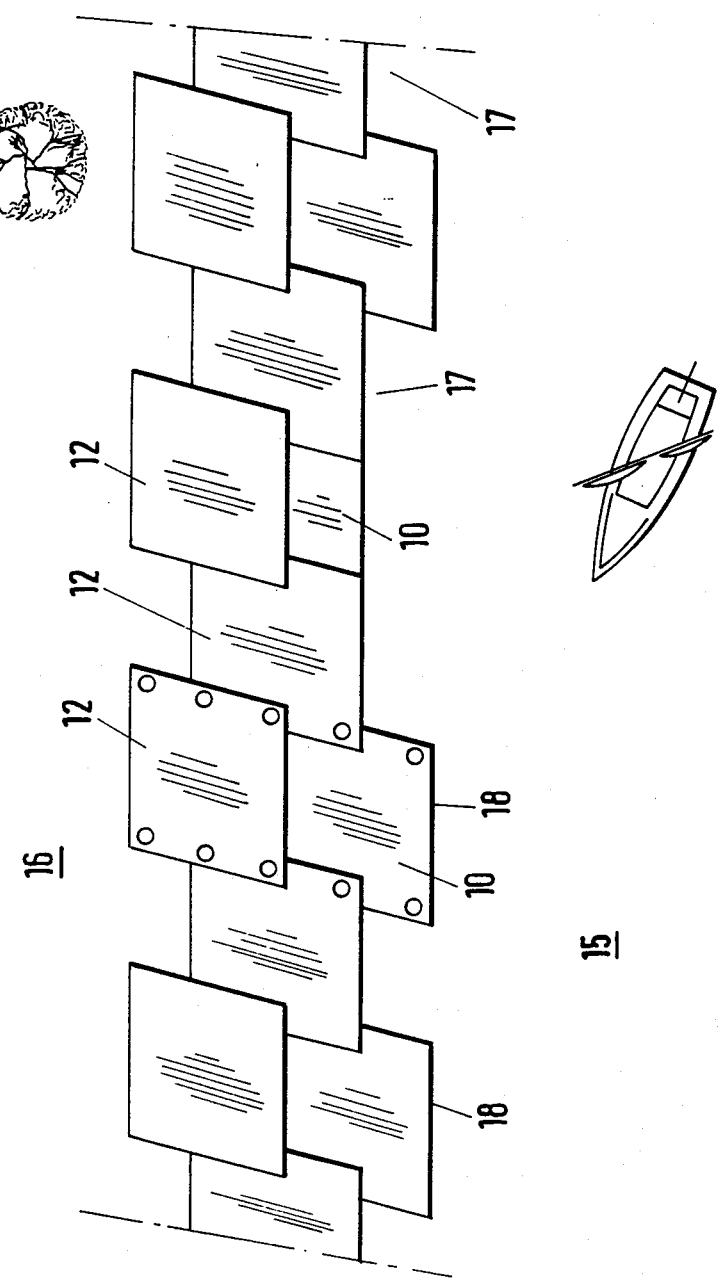

FIG. 17 is a plan view of an application similar to that for FIGS. 15 and 16, where the component elements 9, 10, 11 are parallelopiped joined with pins, 2.

Figure 18:
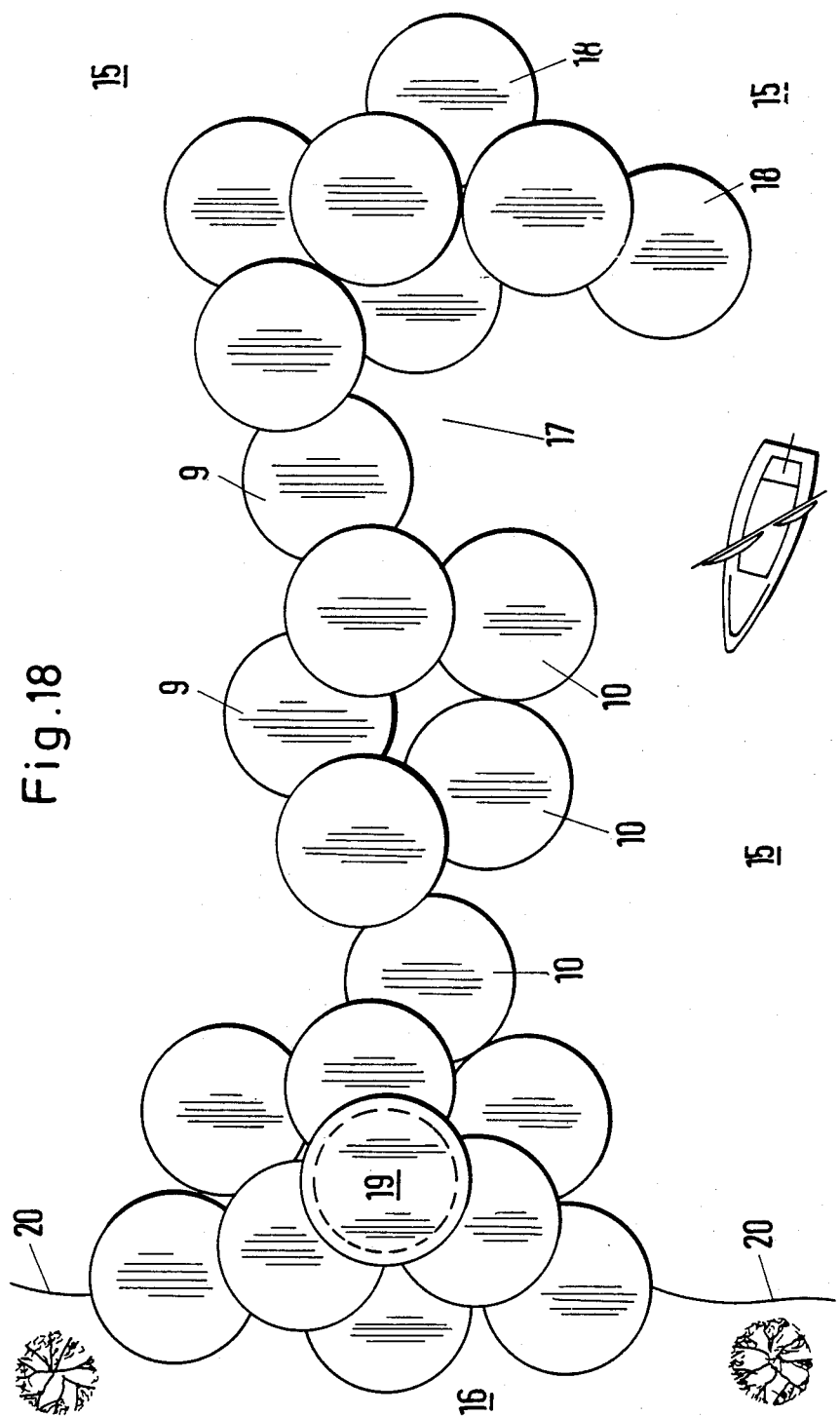

FIG. 18 shows the plan view of an application of this invention acting as a support jetty, made up of circular juxtaposed elements 9, superimposed 10, and clear spaces 13, between the system's component elements, suitably arranged for filling, at least partially and selectively, with rockfill and, should such be the case, with concrete.

FIG. 19 shows the cross section of FIG. 18 where the juxtaposed elements 9 and superimposed elements 10, are circular concrete cylinders forming steppings 12 on two sides. The whole unit rests on a foundation platform 14 and the interior spaces, between the elements 13, are rockfilled.

FIG. 20 shows another cross section of FIG. 18, in where the crown, 12, of the elements, 1, is paved with in situ placed concrete, the surface of which is suitably finished to give the right appearance and be non-slip. The top of the structure is occupied by a hollow element, 4, used as a swimming pool, 23.

FIG. 21 shows a view of an application of this invention, acting as a support jetty, with an irregular, random arrangement of the perimeter which forms noticeable inlets, 17, and promontories, 18, simulating coves and capes. Element 19, different to the others 9, 10, in size and use, is empty with parts built with transparent materials. This element 19 may be assigned to hotel and catering and toilet uses. The denomination 22 indicates a fill of mass concrete which fills the hollows of the superimposed elements, 10, and of the juxtaposd, 9, as well as the empty spaces.

It is to be understood that this invention is not limited to the illustrations so described and shown in this specification which are considered as merely illustrative of the best ways for putting the invention into practice and are liable to modification in shape, size, arrangement of parts and functions) purpose. On the contrary, the invention is for the invention to cover all those modifications within its spirit and scope, as defined by the following claims.

I claim:

1. A jetty system comprising a plurality of vertically-extending shallow modular fluid-impermeable elements having parallel upper and lower planar faces, said elements being in a vertically layered, horizontally offset and cantilevered juxtaposition to define a three-dimensional network characterized by vertical gaps between portions of some of said elements, vertically contiguous elements having all overlapping portions of their respective overlapping upper and lower planar faces contiguous.

2. The system of claim 1 wherein said three-dimensional network allows the passage of fluid intermediate said elements to render it at least partially fluid-permeable.

3. The system of claim 1 wherein at least some of said elements define at least one aperture extending vertically through the thickness thereof, at least some of said elements having their apertures aligned vertically, and said system further comprising union members extending snugly through a series of said aligned apertures for joining said elements together to preclude relative lateral movement therebetween.

4. The system of claim 1 wherein said elements are identical in elevational shape.

5. The system of claim 1 wherein said elements are polygonal in cross section.

6. The system of claim 1 wherein said elements are circular in cross section.

7. The system of claim 1 wherein said elements are shallow relative to the maximum height of said network.

8. The system of claim 1 wherein said elements are horizontally imperforate.

9. The system of claim 3 wherein said elements are horizontally imperforate, identical in elevational shape, and shallow relative to the maximum height of said network, and said network allows the passage of fluid intermediate said elements.

10. The system of claim 3 wherein said elements are inflexible and solid except for said apertures.

* * * * *